(12) United States Patent
Byrne et al.

(10) Patent No.: US 12,281,722 B2
(45) Date of Patent: Apr. 22, 2025

(54) ADJUSTABLE VALVE ACTUATOR

(71) Applicant: Intermatic Incorporated, Spring Grove, IL (US)

(72) Inventors: John Byrne, Spring Grove, IL (US); Jack Bonde, Spring Grove, IL (US); Rudy Janda, Spring Grove, IL (US); Mehari Gedam Tesfamicael, Spring Grove, IL (US); Mark Miller, Spring Grove, IL (US)

(73) Assignee: Intermatic Incorporated, Spring Grove, IL (US)

( * ) Notice: Subject to any disclaimer, the term of this patent is extended or adjusted under 35 U.S.C. 154(b) by 627 days.

(21) Appl. No.: 17/514,324

(22) Filed: Oct. 29, 2021

(65) Prior Publication Data

US 2023/0133838 A1 May 4, 2023

(51) Int. Cl.
*F16K 31/524* (2006.01)
*F16K 31/04* (2006.01)

(52) U.S. Cl.
CPC .......... *F16K 31/524* (2013.01); *F16K 31/046* (2013.01); *F16K 31/047* (2013.01)

(58) Field of Classification Search
CPC ..... F16K 31/524; F16K 31/046; F16K 31/047
See application file for complete search history.

(56) References Cited

U.S. PATENT DOCUMENTS

| | | | |
|---|---|---|---|
| 3,303,299 A | 2/1967 | Raymond, Jr. | |
| 3,334,859 A | 8/1967 | Raymond, Jr. | |
| 3,738,183 A | 6/1973 | Ball, Jr. et al. | |
| 4,705,063 A * | 11/1987 | Robinson | F16K 5/08 403/380 |
| 5,226,454 A | 7/1993 | Cabalfin | |
| 5,305,781 A | 4/1994 | Raymond, Jr. et al. | |
| 5,326,075 A * | 7/1994 | Goff | F16K 31/605 251/285 |
| 5,735,456 A | 4/1998 | Marin et al. | |
| 6,019,129 A * | 2/2000 | Taha | F16K 37/0016 137/553 |

(Continued)

FOREIGN PATENT DOCUMENTS

EP 2 017 512 A1 1/2009

OTHER PUBLICATIONS

U.S. Appl. No. 10/563,780 B2, filed Feb. 18, 2020, Leroyer et al.

(Continued)

*Primary Examiner* — Eric Keasel
(74) *Attorney, Agent, or Firm* — Crowell & Moring LLP (57) ABSTRACT

A valve actuator may include a valve control shaft extending at least partially through a housing of the valve actuator, wherein the valve control shaft is configured for controlling a valve position of a diverter valve. A first cam wheel may be included, where the first am wheel at least partially surrounds the valve control shaft. A first cam may be fixed to the first cam wheel, and a first microswitch may have an actuator located in a rotational path of the first cam. The valve actuator may also include a second cam wheel at least partially surrounding the valve control shaft, where a second cam is fixed to the second cam wheel, and where a second microswitch has an actuator located in a rotational path of the second cam.

3 Claims, 11 Drawing Sheets

(56) References Cited

U.S. PATENT DOCUMENTS

| | | | |
|---|---|---|---|
| 6,079,442 | A | 6/2000 | Raymond, Jr. et al. |
| 6,206,043 | B1 | 3/2001 | Griswold et al. |
| 6,880,806 | B2 | 4/2005 | Haikawa et al. |
| 7,163,192 | B2 | 1/2007 | Aoki et al. |
| 7,798,170 | B2 | 9/2010 | Hotz et al. |
| 7,934,518 | B2 | 5/2011 | Rho et al. |
| 8,393,595 | B2 | 3/2013 | Querio |
| 8,490,943 | B2 | 7/2013 | Buhler et al. |
| 8,910,662 | B2 | 12/2014 | Tan et al. |
| 9,231,453 | B2 | 1/2016 | Abe et al. |
| 2004/0099833 | A1 | 5/2004 | Haikawa et al. |
| 2005/0184265 | A1 | 8/2005 | Aoki et al. |
| 2007/0012367 | A1 | 1/2007 | Hotz et al. |
| 2009/0322359 | A1 | 12/2009 | Rho et al. |
| 2010/0102260 | A1 | 4/2010 | Querio |
| 2011/0204274 | A1 | 8/2011 | Buhler et al. |
| 2014/0028159 | A1 | 1/2014 | Abe et al. |
| 2014/0060656 | A1 | 3/2014 | Uy et al. |
| 2015/0204457 | A1 | 7/2015 | Jordan et al. |
| 2017/0016548 | A1 | 1/2017 | Jackson |
| 2019/0360601 | A1 | 11/2019 | Leroyer et al. |
| 2020/0041033 | A1 | 2/2020 | Goldman |

OTHER PUBLICATIONS

U.S. Appl. No. 10/465,801 B2, filed Nov. 5, 2019, Jackson.
U.S. Appl. No. 10/140,843 B2, filed Nov. 27, 2018, Jordan et al.
U.S. Appl. No. 10/041,265 B2, filed Aug. 7, 2018, Uy et al.

* cited by examiner

ADJUSTABLE VALVE ACTUATOR

TECHNICAL FIELD

The present disclosure relates to an adjustable valve actuator. In particular, the present disclosure relates to a valve actuator for operating a diverter valve, where the valve actuator includes an adjustable valve limit.

BACKGROUND

Spas, hot tubs, and pools are well known in the art and in wide use for therapeutic purposes, physical relaxation, and enjoyment. Often, a single water recirculating system is used to circulate water through multiple bodies of water (e.g., spa and a pool). A single pump may provide water to separate water jets in a pool and spa depending on the system's settings, for example.

To control where water flows, a diverter valve is often included, which can direct water to a specified location (or multiple locations). Such diverter valves often are paired with a valve actuator that provides general, automated actuation of the diverter valve via operation of an electric motor. For instance, one example of a valve actuator is a "24-Volt Valve Actuator," Model PE24VA, sold by Intermatic® of Spring Grove, IL.

While certain valve actuators have been used with great success, including the specific example noted above, the present disclosure relates to a valve actuator with certain improvements, including enhanced adjustability of certain valve parameters or limits.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

The present disclosure relates to an adjustable valve actuator, particularly where the valve actuator includes a valve parameter that is adjustable. In accordance with certain aspects discussed below, the valve actuator may include a removable cover such that certain adjustable internal components are accessible to an operator (e.g., a serviceman). In contrast with prior valve actuators, these internal components may be adjustable without the need for specialized tools, and in certain non-limiting exemplary embodiments, the internal components of the valve actuator are configured to be manipulated fully by hand to set certain valve limits/parameters or other adjustable diverter valve characteristics.

Additionally, certain aspects discussed herein provide a near-infinite level of adjustment of certain valve characteristics, such as valve setting parameters corresponding with particular rotational positions of a valve control shaft. By contrast, certain existing valve actuators, to the extent they are adjustable at all, include only step-wise adjustment between a limited number of distinct stages.

FIGS. 1-4 show a set of views illustrating the operation of a diverter valve 100. For example, the diverter valve 100 may operate to control water flow through a pool and/or spa system. While the present depicted embodiments generally relate to a pool, spa, or other water systems, many other suitable applications are also contemplated.

The diverter valve 100 may generally function to control water flow between two or more outlets, such as the depicted first outlet 102 and the depicted second outlet 104. The first outlet 102 may lead to a spa system and the second outlet 104 may lead to a pool system, for example. Different valve positions of the diverter valve 100 distribute water flow from the inlet 106 to between the outlets differently. During normal operation, different valve positions may be achieved with a valve actuator 108 configured to rotate or otherwise move the valve control shaft 110. The valve actuator 108 is discussed in further detail below.

Figure 1:
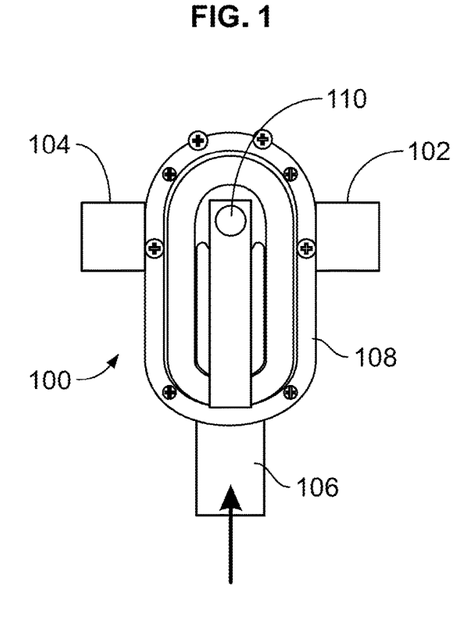
FIG. 1 is an illustration showing a diverter valve having a valve actuator in accordance with certain aspects of the present disclosure, where the valve is in a "closed" valve position.

Referring to FIG. 1, in a "closed" valve position, the diverter valve 100 may prevent fluid communication between an inlet 106 and both the first outlet 102 and the second outlet 104. In this setting, flow through the diverter valve 100 may be prevented, and all downstream water systems may be "off" as a result.

Figure 2:
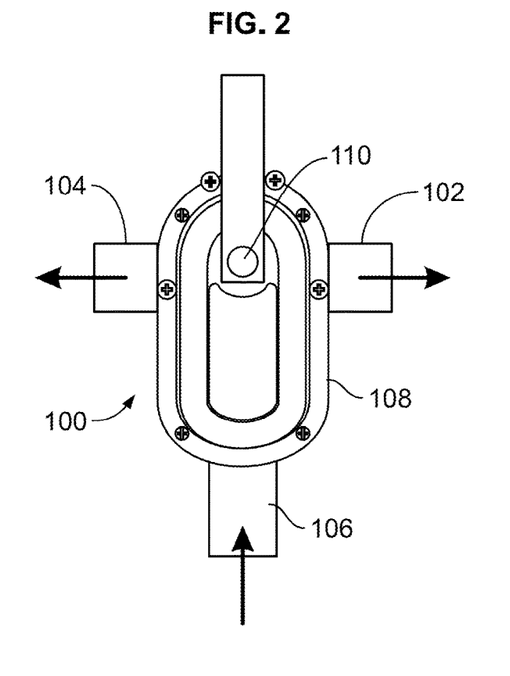
FIG. 2 is an illustration showing the valve of FIG. 1 in an "open" valve position.

FIG. 2 shows an "open" valve setting, where the diverter valve 100 remains substantially clear of the flow path and allows water to flow through the diverter valve 100 relatively uninhibited. In this setting, ignoring downstream effects, roughly half of the flow rate at the inlet 106 is diverted to the first outlet 102, and the other half is diverted to the second outlet 104. Both downstream systems may be "on" at an intermediate level, for example.

Figure 3:
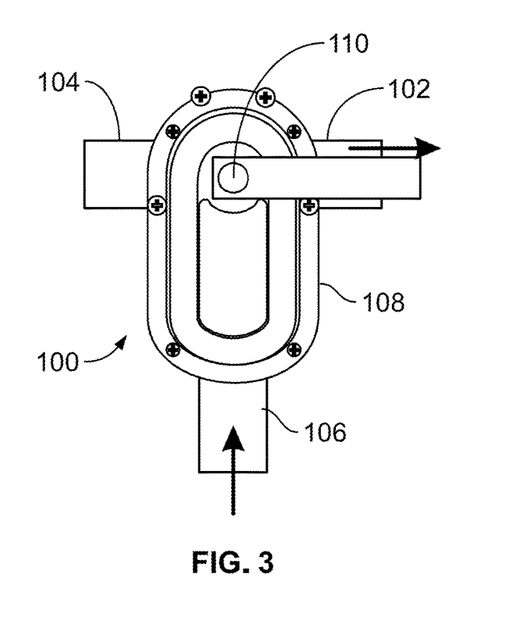
FIG. 3 is an illustration showing the valve of FIG. 1 in a first valve position, where flow of a liquid is diverted to a first outlet.

In a first valve position v1 shown in FIG. 3, the diverter valve 100 may direct all flow to the first outlet 102. In other words, the first outlet 102 may be in fluid communication with the inlet 106 while the second outlet 104 is blocked by the valve. In this setting, the downstream water system corresponding to the first outlet 102 may be "on" at its maximum intensity level, while the downstream water system corresponding to the second outlet 104 may be closed. The opposite may be true in a second valve position v2 illustrated by FIG. 4. That is, in this setting, the diverter valve 100 may direct all flow to the second outlet 104, while the first outlet 102 is blocked by the diverter valve 100.

While not shown, the valve may also be capable of any number of intermediate settings between any of those shown in FIGS. 1-4. For instance, the diverter valve 100 may be capable of allowing flow through both the first outlet 102 and the second outlet 104, but at different flow rates. Similarly, the diverter valve 100 may include an intermediate position between the "closed" setting and either one of the first valve position v1 and second valve position v2 shown in FIGS. 3-4, where flow is allowed through only one outlet and at a relatively low flow rate. Other settings are also contemplated (e.g., when more or fewer outlets are included, using more than one valve, increasing the complexity of the valve structure and/or surrounding plumbing systems for more advanced flow control, etc.).

Figure 4:
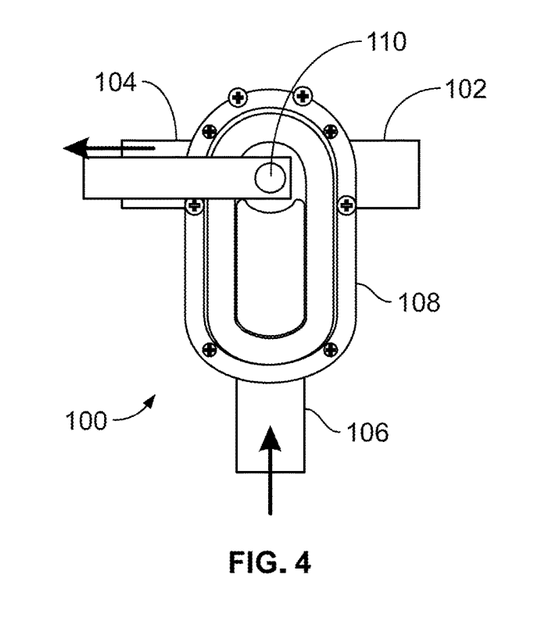
FIG. 4 is an illustration showing the valve of FIG. 1 in a second valve position, where flow of a liquid is diverted to a second outlet.
Figure 5:
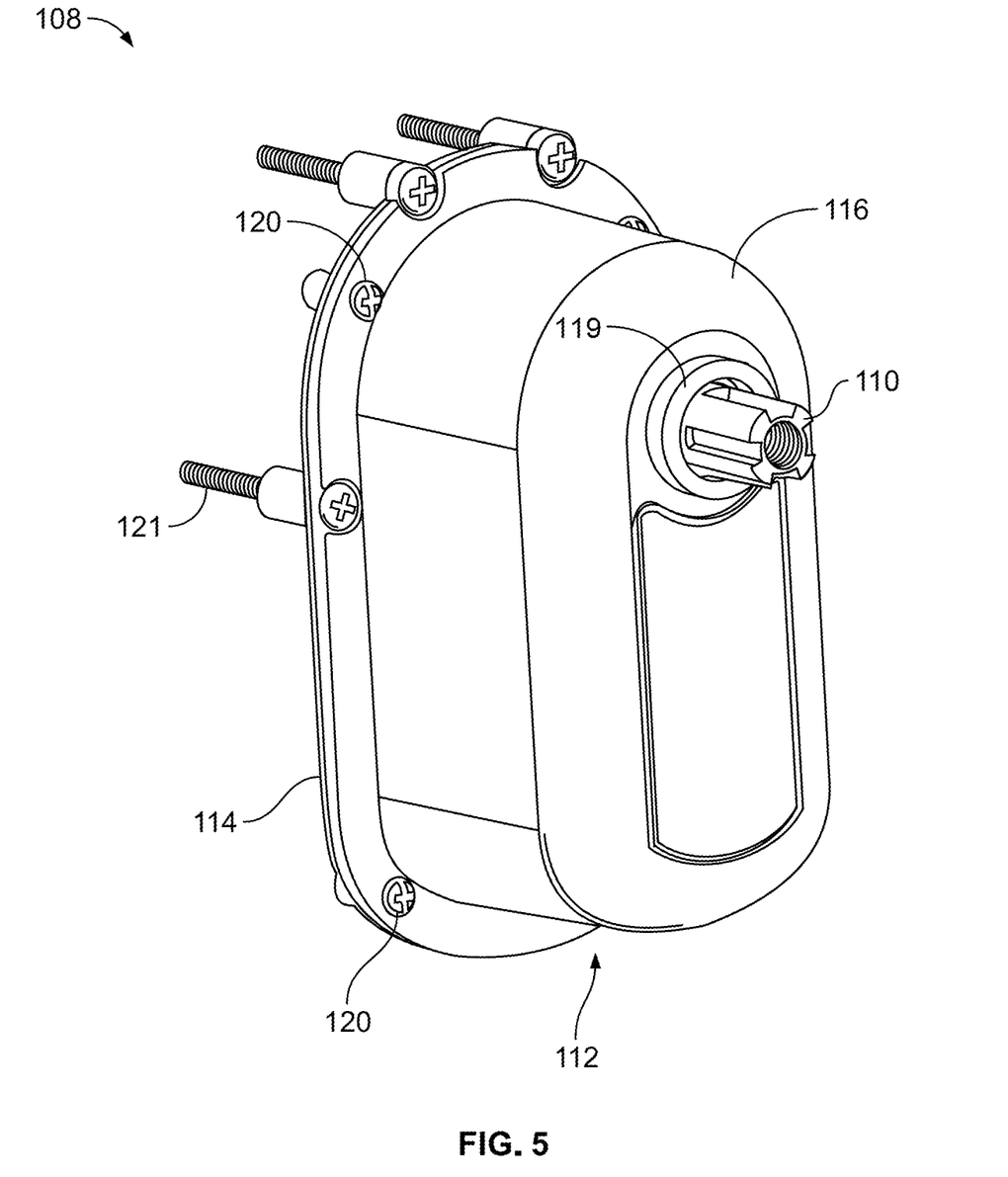
FIG. 5 is an illustration showing a perspective view of an adjustable valve actuator in accordance with certain aspects of the present disclosure.
Figure 6:
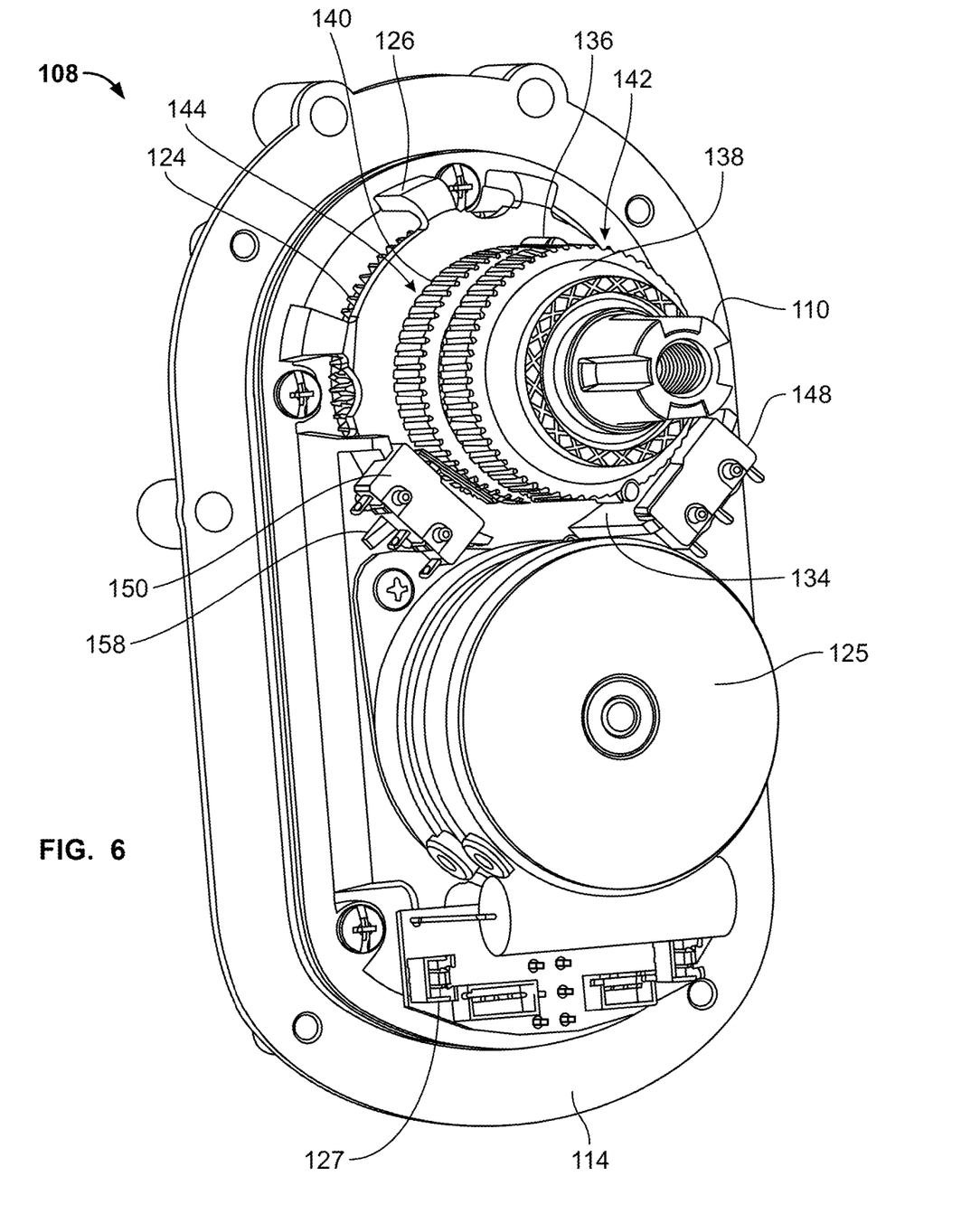
FIG. 6 is an illustration showing a perspective view of the valve actuator of FIG. 5, where the cover is removed, and where the valve actuator includes two cam wheels for adjusting two respective cams in accordance with certain aspects of the present disclosure.
Figure 7:
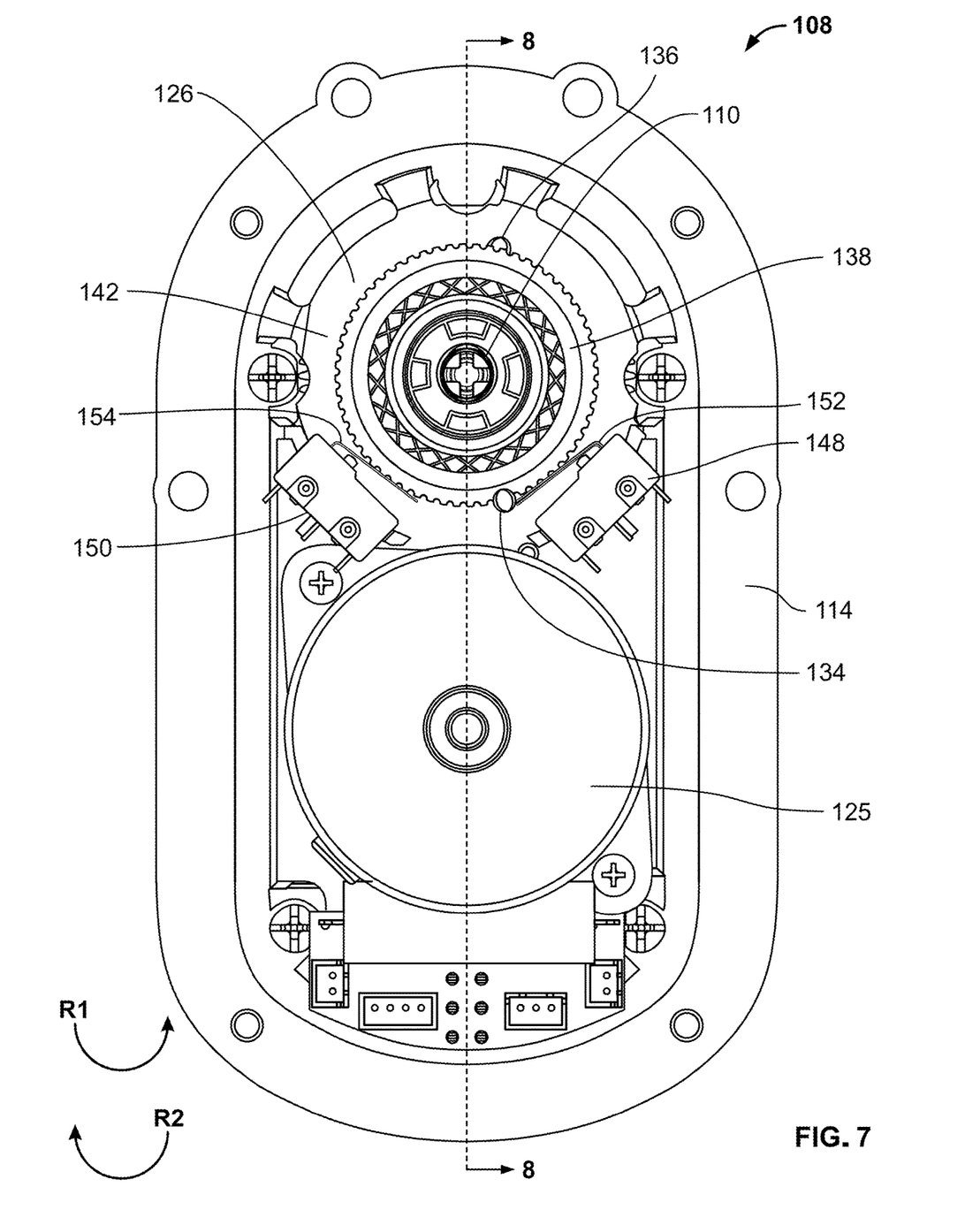
FIG. 7 is an illustration showing a top view of a portion of the valve actuator from FIGS. 5-6.

FIG. 5 shows the valve actuator 108 in isolation. In this example, the majority of the exterior of the valve actuator may be formed by a housing 112 of the valve actuator 108, which generally includes a valve actuator base 114 and a housing cover 116. a valve control shaft 110 extending through the housing 112 may be mechanical communication with internal components of the diverter valve such that rotation (or other movement) of the valve control shaft 110 causes the diverter valve to change settings. For example, rotation of the valve control shaft 110 may cause the diverter valve to switch between settings discussed above with reference to FIGS. 1-4.

In some embodiments, the valve control shaft 110 may extend through an opening of the housing cover 116 such that it is exposed outside the housing 112. Advantageously, this may allow the valve control shaft 110 to be directly, manually manipulated by a user to change the diverter valve's settings. A handle 118 may be included (shown in FIGS. 1-4 only) for facilitating this manual operation. To ensure the handle 118 is properly located in a vertical direction, a collar 119 may be included to space the handle 118 from an upper surface of the housing cover 116, for example.

The housing cover 116 may typically be secured to the valve actuator base 114 under normal conditions, which is shown in FIG. 5. A set of fasteners 120, in this case screws, may fix the housing cover in place, for example. Screws or other fasteners may be advantageous for preventing end users from tampering with the internal components of the valve actuator 108. The fasteners 120 keeping the housing cover 116 in place may be separate from fasteners 121, which generally fix the valve actuator base 114 to another component (e.g., the valve, flooring near a pool, etc.). However, to simplify maintenance and/or adjustment of the valve actuator 108 (as discussed in more detail below), it may be desirable for the fasteners 120 to be removable/releasable such that the internal components of the valve actuator 108 may be accessed by a serviceman. Optionally, the fasteners 120 may be replaced or supplemented with one or more catches 123 (shown in FIGS. 8-10), which may reduce the number of screws or other fasteners needed.

FIG. 6-13 show several views of a non-limiting embodiment of the valve actuator 108 when the cover is removed, and/or certain components thereof. As mentioned above, the valve control shaft 110 may be movable manually (e.g., via a handle). When the valve actuator 108 also includes automated movement (e.g., computer-controlled movement between a variety of valve settings), a motor 125 may be included for causing such automated movement, which may be at least partially controlled via a circuit board 127. The motor 125 may be mechanically coupled to the valve control shaft 110 via a set of interconnected gears 122 (shown in FIG. 11) such that, when a rotor of the motor 125 spins, this movement causes rotation of the valve control shaft 110. In this non-limiting depicted example, a primary gear 124 is fixed to the valve control shaft 110, for example, such that when the primary gear 124 spins, the valve control shaft 110 also spins.

Optionally, even when the housing cover 116 of the valve actuator 108 is removed, the gears 122 may remain generally inaccessible due to a gear protection cover 126 as shown in FIG. 6-10, which may be removable separately from the housing cover 116. Advantageously, when a maintenance person removes the housing cover 116 to access certain components, the gears 122 may remain inaccessible for safety purposes, for cleanliness (e.g., preventing lubrication from spreading throughout the interior of the housing 112), etc.

The motor 125 may be capable of rotating the valve control shaft 110 in either rotational direction, R1 or R2, about the central axis of the valve control shaft 110. While any suitable circuitry is contemplated to accomplish multi-directional capabilities, one non-limiting example involves an AC circuit that powers the motor 125. The motor 125 may have two primary coils, where one coil is powered directly from a power source in a first circuit, and where the other is powered after the current has passed from the power source through a phase shifting capacitor in a second circuit. Direction of the motor 125 may be selected between providing a current to one of two input power lines: a first input line 130 (e.g., FIG. 14) electrically connected to the first circuit, and a second input line 132 (e.g., FIG. 14) electrically connected to a second circuit. A switch may be included for determining which input line receives the current from the power source.

The valve actuator 108 may include one or more limitation aspects that limit rotation of the valve control shaft 110, for example setting the position of v1 or v2 of FIGS. 3-4. The limitation aspect may be any suitable device or method, such as via interruption of one or more of the motor's circuits, via physical stops or barriers, etc. In the depicted example of FIGS. 6-13, the limitation aspect(s) include one or more microswitches that are configured to interrupt the motor's above-described circuits, thereby stopping the motor 125 once the valve control shaft's rotation reaches a certain, adjustable point. In alternative embodiments, the microswitches may cause the motor 125 to cease rotation in at least one direction via sending a signal to a controller. The microswitches may be actuatable via contact with one or more rotating cams, where the rotating cams are adjustable.

To illustrate, the valve actuator 108 includes a first cam 134 that extends from a first outer perimeter surface 142 of a first cam wheel 138. Similarly, a second cam 136 extends from a second outer perimeter surface 144 of the second cam wheel 140. In an operational state (i.e., when the housing is closed and the valve actuator 108 is operating in a normal state without maintenance intervention), the first cam wheel 138 and the second cam wheel 140 may be substantially fixed relative to the valve control shaft 110. Accordingly, when the valve control shaft 110 rotates, the first cam wheel 138 and the second cam wheel 140 will rotate in the same manner, thereby displacing the first cam 134 and the second cam 136 along respective rotational paths. The first cam wheel 138 may be located generally above the second cam wheel 140 with a space 146 therebetween, and the first cam wheel 138 and the second cam wheel 140 may rotate in substantially parallel planes.

A first microswitch 148 may be arranged with a first actuation arm 152 located in the rotational path of the first cam 134, but where the first actuation arm 152 may remain spaced from the first outer perimeter surface 142 of the first cam 134 when it is clear of the first cam 134. Thus, the first microswitch 148 may be actuated when the first cam 134 rotates into contact with the first actuation arm 152. Similarly, a second microswitch 150 may also be included, and may be actuated when the second cam 136 rotates into contact with a second actuation arm 154 of the second microswitch 150. To accommodate the "lower" rotational path of the second cam 136, the second microswitch 150 may be located closer to the valve actuator base 114 than the first microswitch 148.

The first microswitch 148 and the second microswitch 150 may generally be approached from different directions by the first cam 134 and the second cam 136, respectively. The first microswitch 148 may be located such that it provides a limit to valve control shaft rotation in a first direction R1, and the second microswitch 150 may be located such that it provides a limit to the valve control shaft rotation in a second direction R2, where the first direction R1 is opposite of the second direction R2.

The microswitches and/or cams may be arranged/positioned such that the microswitches are actuated when the valve control shaft 110 reaches a particular valve setting. For example, the first cam 134 may be located relative to the valve control shaft 110 such that it contacts/actuates the first microswitch 148 when the valve is in a first valve setting v1 (e.g., FIG. 3). Similarly, the second cam 136 may be located relative to the valve control shaft 110 such that it contacts/actuates the second microswitch 150 when the valve is in a second valve setting v2 (e.g., FIG. 4). However, these particular valve settings are used only as non-limiting examples for illustration purposes, and the device may be set up such that the microswitches trigger upon reaching any suitable valve setting (or an intermediate position). Further, while only two cams, cam wheels, and microswitches are included, more or fewer may be included to correspond with more or fewer valve settings.

To hold the microswitches in the desired location, one or more microswitch supports 158 may be included, where the microswitch supports 158 are fixed relative to, and extend from, the valve actuator base 114. When the first microswitch 148 is actuated (e.g., upon contact with the first actuator arm 152), the first microswitch 148 may interrupt motor operation to stop valve adjustment. Similarly, when the second microswitch 150 is actuated (e.g., upon contact with the second actuator arm 154), the second microswitch 150 may halt valve adjustment at the desired location.

At least one of the first cam 134 and the second cam 136 may be adjustable relative to the valve control shaft 110 such that the valve settings triggering the microswitch(es) can be altered, for example by maintenance personnel. For example, the first cam 134 may be adjustable via: (1) releasing the first cam wheel 138 from its fixed relationship with the valve control shaft 110; (2) rotating or otherwise displacing the first cam wheel 138 relative to the valve control shaft 110 in this released, non-fixed state (thereby causing rotation/displacement of the first cam 134 relative to the valve control shaft 110); and (3) re-engaging the first cam wheel 138 into its fixed state with the valve control shaft 110 such that the valve actuator 108 again is operable normally in its newly-adjusted configuration. The second cam 136 can be adjusted in a similar manner via relative rotation of the second cam wheel 140 with the valve control shaft 110.

Any suitable method or apparatus may be used to release and re-engage the cam wheels with the valve control shaft 110. In the depicted embodiment, the cam wheels may be movable vertically (parallel to the rotational axis) to switch between the fixed operational state and an adjustment state, where they are rotatable relative to the valve control shaft. To illustrate, FIG. 8 shows the first cam wheel 138 in a raised, fixed state while FIGS. 9-10 show the first cam wheel 138 in a lowered, adjustment state.

Figure 8:
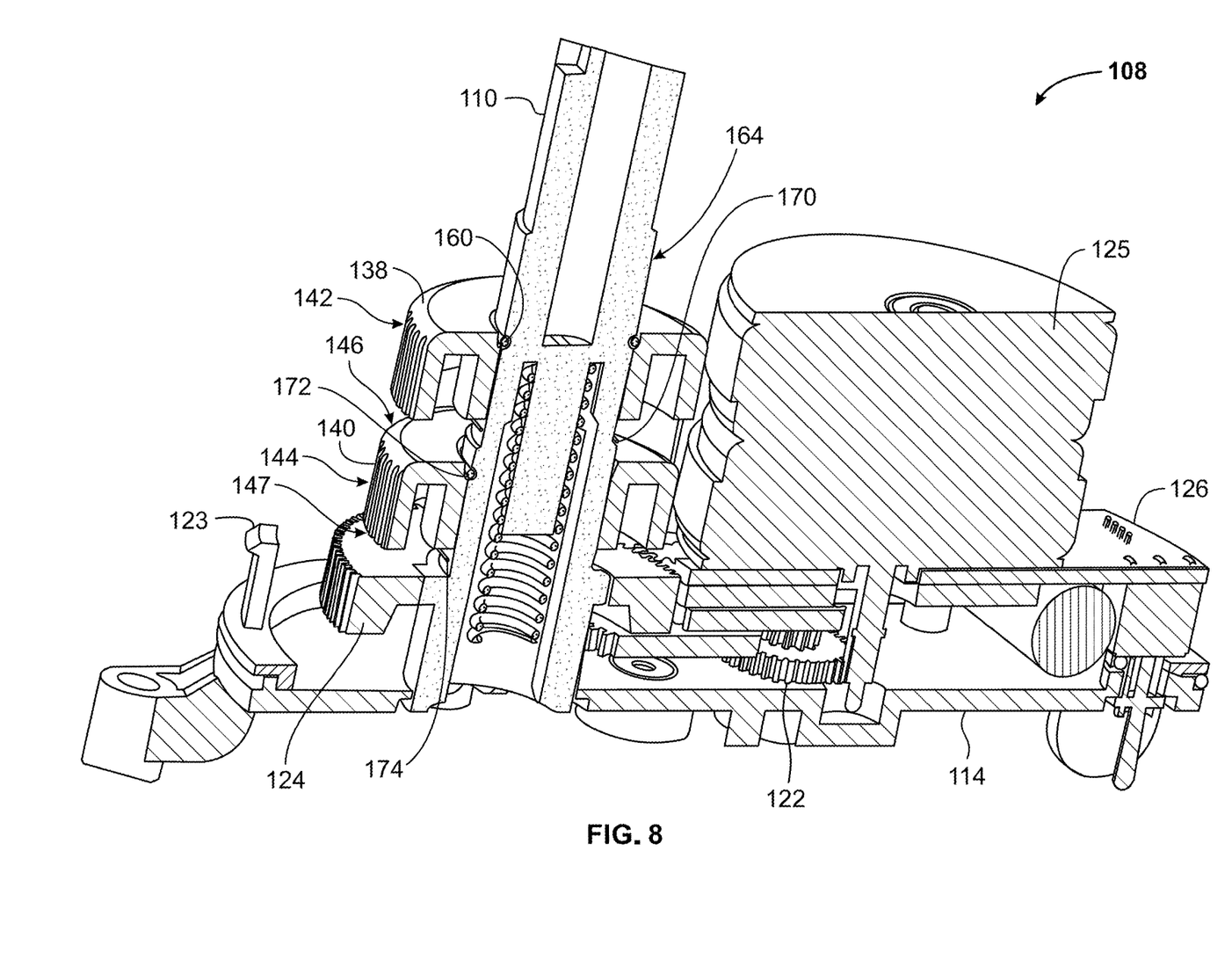
FIG. 8 is an illustration showing a section view of the valve actuator of FIGS. 5-7 about section 8-8 depicted in FIG. 7, where a first cam wheel is in a raised operational position in accordance with certain aspects of the present disclosure.

In the operational state of FIG. 8, a first O-ring 160 may be located at least partially between an inner-facing surface 162 of the first cam wheel 138 and an outer-facing surface 164 of the valve control shaft 110. The first O-ring 160 may cause sufficient friction between the first cam wheel 138 and the valve control shaft 110 that the first cam wheel 138 remains fixed from rotating relative to the valve control shaft 110, absent abnormal conditions. To facilitate enhanced friction, the first cam wheel 138 may include one or more O-ring protrusions 166 (shown in FIG. 13) that extend from the inner-facing surface 162 of the first cam wheel 138 towards the valve control shaft 110, thereby creating a topography that pressed into the compliant material of the first O-ring 160. The valve control shaft 110 may include a first groove 168 that maintains the position of the first O-ring 160 relative to the valve control shaft 110.

Figure 12:
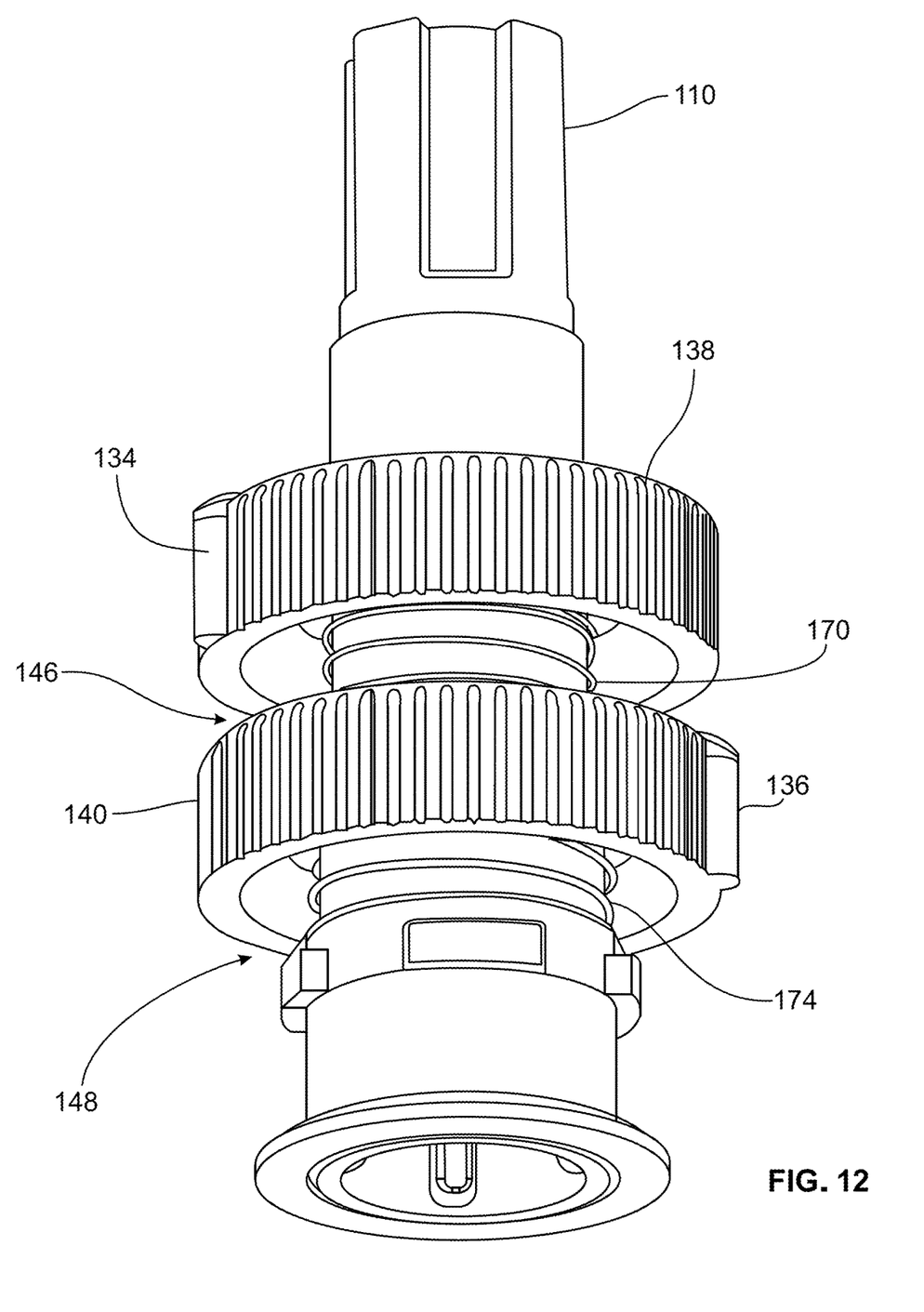
FIG. 12 is an illustration showing a valve control shaft that is surrounded by a first cam wheel and a second cam wheel in accordance with certain aspects of the present disclosure.

A first spring 170 may be included such that the first cam wheel 138 maintains its raised, operational position shown in FIG. 8 (and notably, the first spring 170 is depicted with more visibility in FIG. 12). The first spring 170 may be a compression spring that provides opposite spring forces on the first cam wheel 138 (e.g., forcing the first cam wheel 138 upward) and a spring seat surface of the valve control shaft (e.g., forcing the valve control shaft 110 downward). Another suitable device may be used as an alternative to a spring. While the first spring 170 may be counteracted to move the first cam wheel 138 to a lowered position, the first spring 170 may cause the first cam wheel 138 to enter, or remain in, the raised operational position by default and absent manual intervention.

Figure 9:
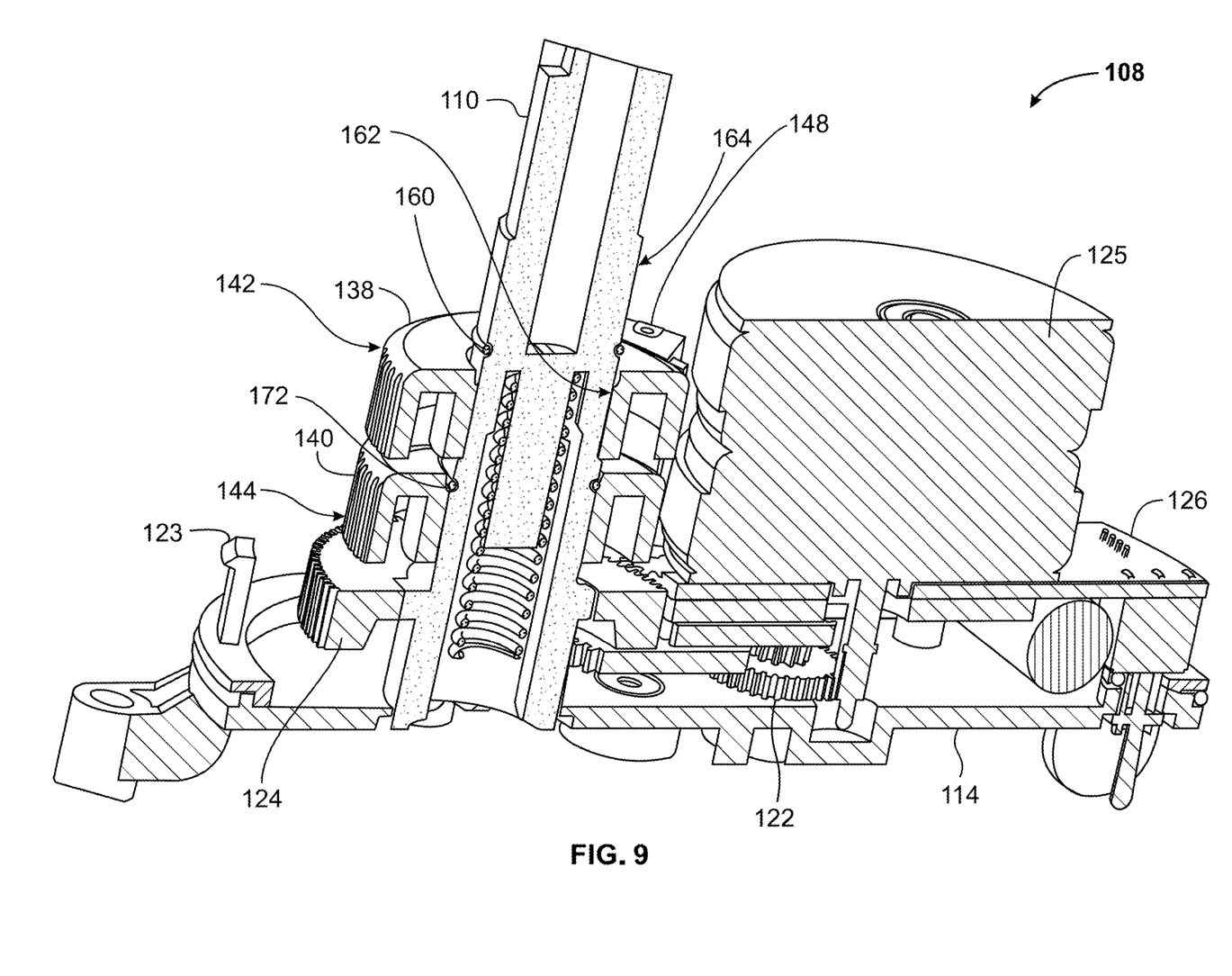
FIG. 9 is an illustration showing the valve actuator of the section view of FIG. 8, where the first cam wheel has moved to a lowered adjustable position in accordance with certain aspects of the present disclosure.
Figure 10:
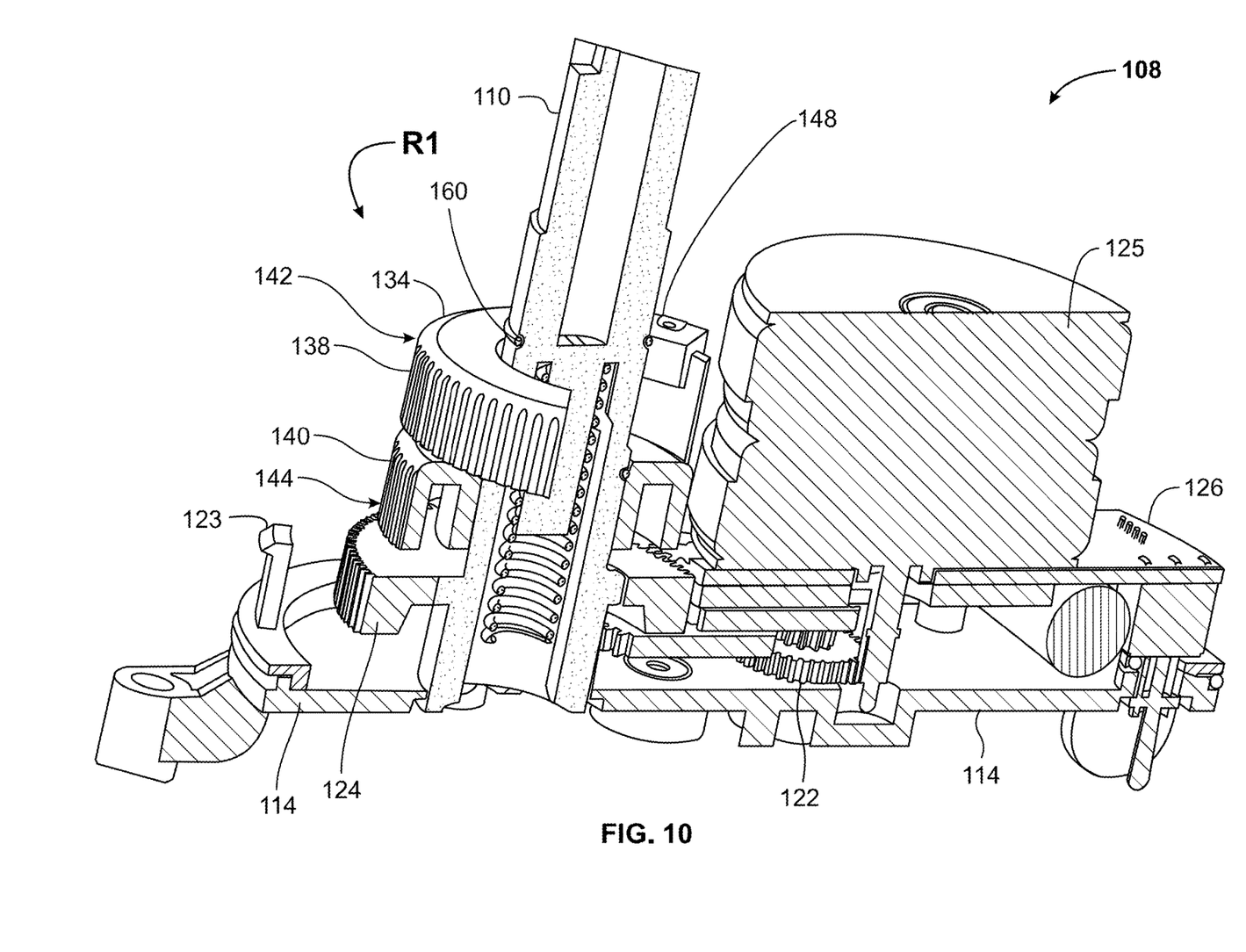
FIG. 10 is an illustration showing the valve actuator of the section view of FIGS. 8-9, where the first cam wheel has rotated in a direction R1 relative to its position in FIG. 9 in accordance with certain aspects of the present disclosure.
Figure 11:
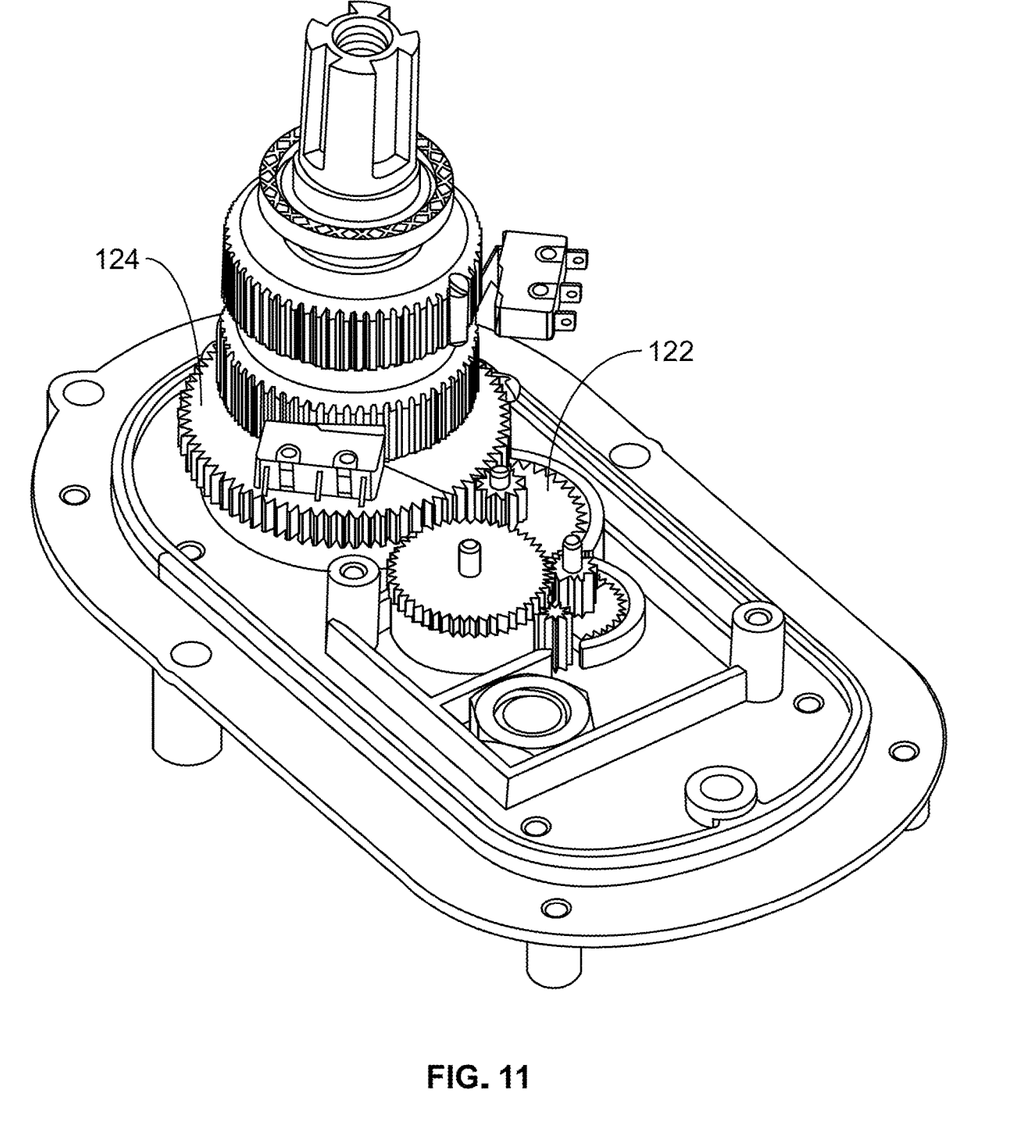
FIG. 11 is an illustration showing a perspective view of a portion of the valve actuator from FIGS. 5-10, where the valve actuator includes a set of gears for automatic movement of a valve shaft via motor operation in accordance with certain aspects of the present disclosure.

By contrast, the first cam wheel 138 is shown in a lowered position in FIG. 9. The lowered position may be an adjustment state, where the first cam wheel 138 is spaced from the first O-ring 160 such that it is easily rotatable relative to the valve control shaft 110 (e.g., by hand), from the position of FIG. 9 to the position of FIG. 10 (or the other direction). Notably, the rotation in either direction may allow for adjustment of the cams into many different cam positions, perhaps infinite in variety (e.g., since adjustment occurs in a non-discrete manner, and there are no distinct "stages" required by latching mechanisms, etc.). To move the first cam wheel 138 into this lowered position, a downward force may be applied to the first cam wheel 138 to counteract the spring force. When it is desirable for the valve actuator 108 to be adjustable without specific tools, the first spring 170 may be sized such that it can be counteracted by hand, for example. Once the downward force is concluded, the first spring 170 may cause the first cam wheel 138 to move back into its raised, operational position. The first spring 170 is not shown in FIG. 9 for purposes of simplicity of description, but reference is made to FIG. 12.

The second cam wheel 140 may be adjustable in a similar or identical manner. Accordingly, the second cam wheel 140 may be associated with a second O-ring 172 that is located in a second (lower) groove of the valve control shaft 110. A second spring 174, shown in FIG. 8 and FIG. 12, may act in a manner similar to the first spring 170 such that the second spring 174 is in an operational, fixed state by default.

Figure 13:
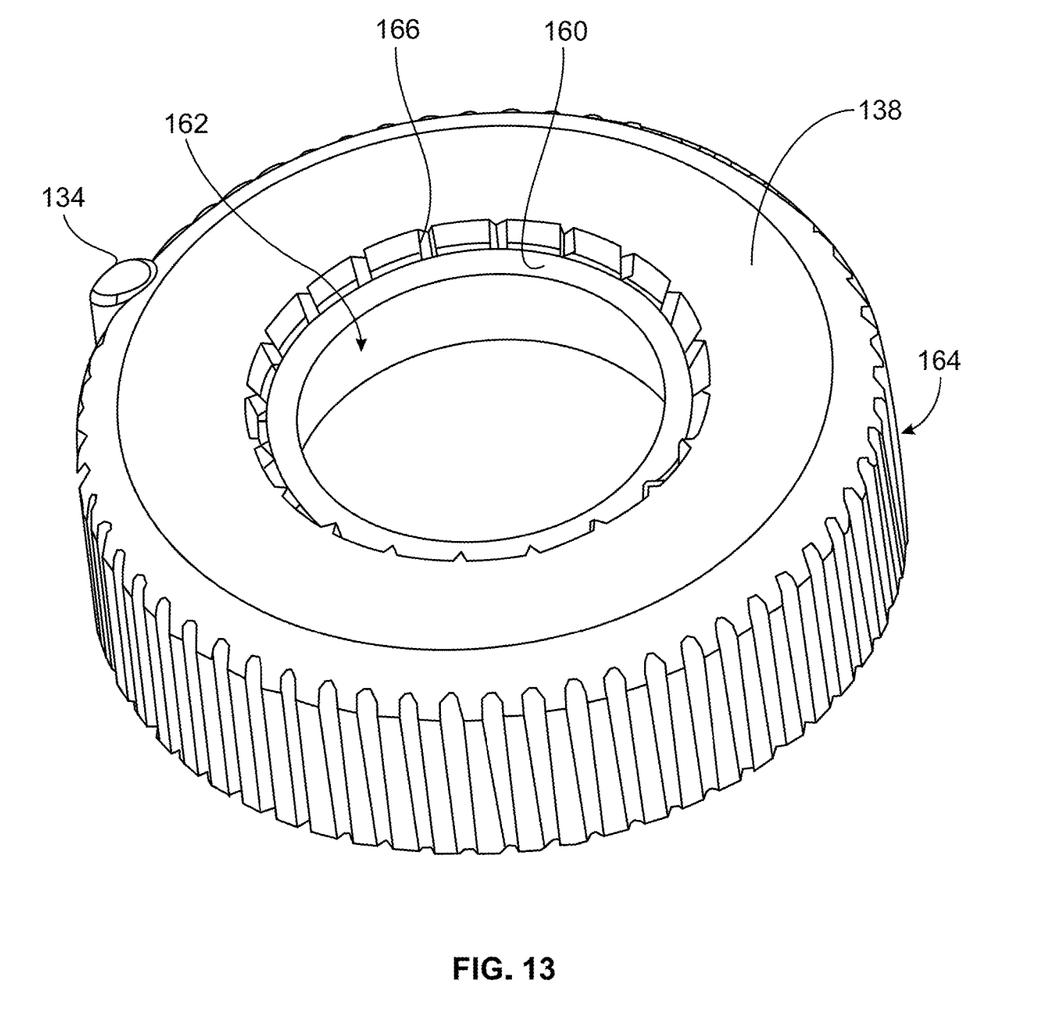
FIG. 13 is an illustration showing a cam wheel having a cam and a set of O-ring protrusions contacting an O-ring in accordance with certain aspects of the present disclosure.

Notably, in the default, operational state, a space 146 may exist between the first cam wheel 138 and the second cam wheel 140, and a similar space 147 may exist beneath the second cam wheel 140. These spaces 146, 147, which are shown in FIG. 13, may accommodate downward movement of the first cam wheel 138 and the second cam wheel 140, respectively, when moving into the lowered adjustable position. Advantageously, such spaces allow for independent adjustment of the first cam wheel 138 and the second cam wheel 140.

Notably, the valve actuator 108 be adjustable via cam movement without any specifically-designed tools, and perhaps completely by hand. In the depicted example, a screwdriver for removing the housing cover 116 may be the only useful tool at all. While it is also contemplated that the cover could be configured for hand removal, it may be advantageous to include screws or other fasteners such that children, pets, etc. do not access the interior of the housing cover 116.

Figure 14:
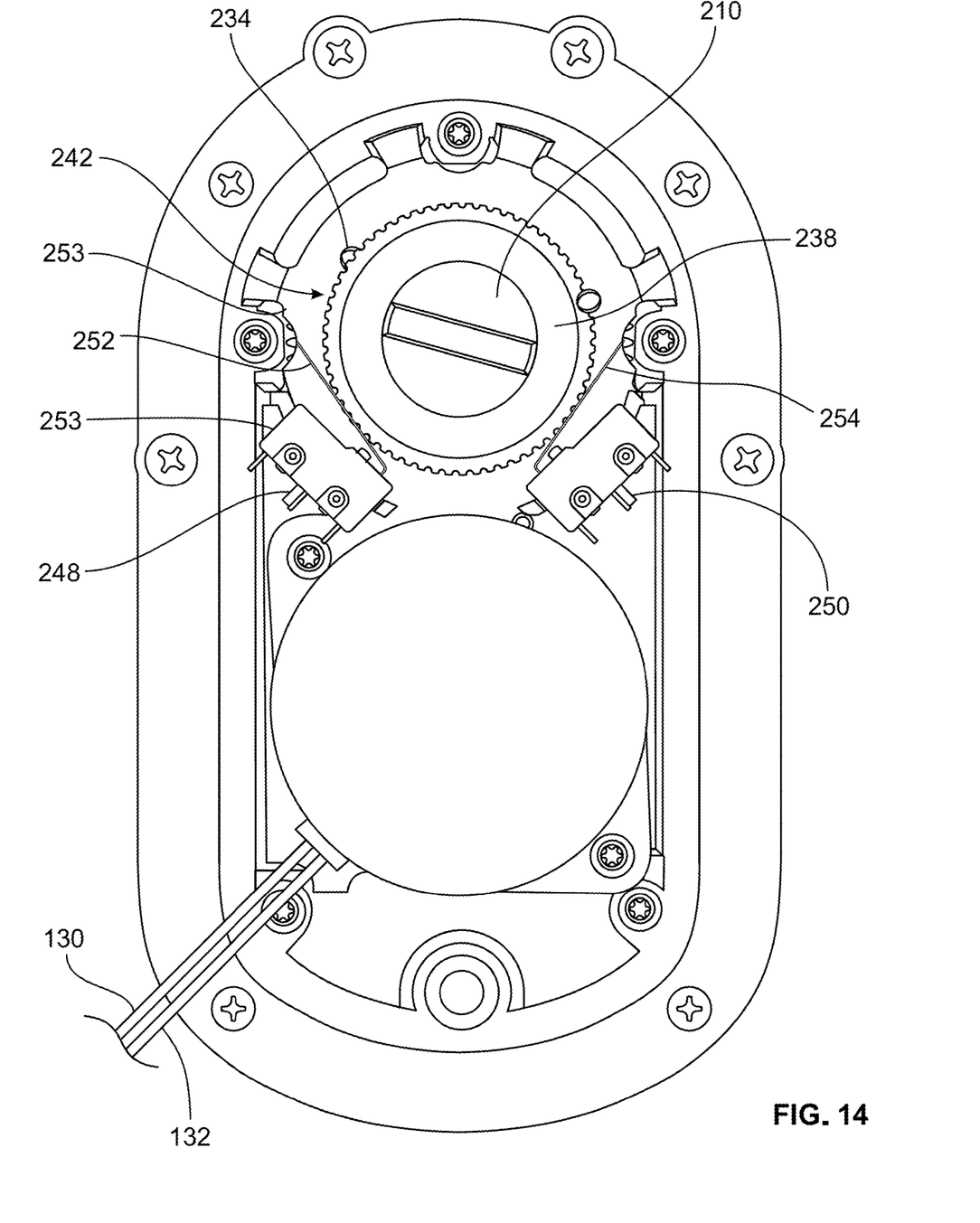
FIG. 14 is an illustration showing a top view of an additional embodiment of a valve actuator for controlling a diverter valve, where the valve actuator includes microswitches with elongated arms in accordance with certain aspects of the present disclosure.

FIG. 14 shows an alternative design, which is similar to the embodiment discussed above but with redesigned microswitches. For example, as shown in FIG. 14, a first microswitch 248 and a second microswitch 250 respectively have a first actuator arm 252 and a second actuator arm 254. The actuator arms 252, 254 are lengthened relative to the embodiment discussed above. In particular, the actuator arm 252 extends beyond the outer edge 253 of the microswitch 248, and the second actuator arm 254 extends a similar length. Optionally, the first actuator arm 252 may extend to a point of support, such as an attachment point 253 with an interior wall of a housing cover (not shown). Further, the first actuator arm 252 may extend generally tangent relative to an outer perimeter surface 242 of a cam wheel 238 (either in contact with the outer perimeter surface 242 or just out of contact), which may ensure solid, reliable engagement with a cam 234 when contact occurs.

The attachment point 253 may act as a point of support for the first actuator arm 252 such that it can resist incidental contact with an outer perimeter surface 242 of the cam wheel 238, and/or partial contact with the cam 234, without triggering the first microswitch 248. Further, since the valve control shaft 210 may be rotated by hand (e.g., for manual adjustment with a handle), the elongated actuation arm 252 may ensure that the cam wheel 238 may rotate through the point of contact with the first actuation arm 252 in either direction without damaging any components, entering a "stuck" position that the motor cannot rotate the control shaft 210 out of, etc.

While various embodiments have been described, it will be apparent to those of ordinary skill in the art that many more embodiments and implementations are possible. Accordingly, the embodiments described herein are examples, not the only possible embodiments and implementations.

Having described various aspects of the subject matter above, additional disclosure is provided below that may be consistent with the claims originally filed with this disclosure. In describing this additional subject matter, reference may be made to the previously described figures. Any of the following aspects and/or optional implementations thereof may be combined, where compatible.

A first general aspect includes a valve actuator, a valve control shaft extending at least partially through a housing of the valve actuator, where the valve control shaft is configured for controlling a valve position of a diverter valve. The valve actuator also includes a first cam wheel at least partially surrounding the valve control shaft. The actuator also includes a first cam fixed to the first cam wheel. The actuator also includes and a first microswitch having an actuator located in a rotational path of the first cam.

Implementations may include one or more of the following optional features. The valve actuator may include: a second cam wheel at least partially surrounding the valve control shaft; a second cam fixed to the second cam wheel; and a second microswitch having an actuator located in a rotational path of the second cam. The first cam wheel and the second cam wheel are spaced in a direction parallel to a rotational axis of the valve control shaft. The first cam controls a first valve parameter as the valve control shaft rotates in a first direction, and where the second cam controls a second valve parameter as the valve control shaft rotates in a second direction, the first direction being opposite the second direction. The first microswitch interrupts a first circuit of a motor when actuated, and where the second microswitch interrupts a separate second circuit of the motor when actuated, where the first circuit includes an input for operating the motor in a first direction, and where the separate second circuit includes a second input for operating the motor in an opposite second direction. The actuator of the second microswitch is located closer to a valve actuator base than the actuator of the first microswitch. The first cam wheel includes an operational position and an adjustment position, where the first cam wheel is fixed relative to the valve control shaft in the operational position, and where the valve control shaft is rotatable relative to the valve control shaft when the first cam wheel is in the adjustment position. The valve actuator may include a spring mechanically coupled to the first cam wheel such that the first cam wheel is biased towards the operational position due to a spring force of the spring. The o-ring is compressed between the first cam wheel and the valve control shaft when the first cam wheel is in the operational position. The first cam wheel includes at least one o-ring protrusion extending from an inner surface of the first cam wheel for engaging the o-ring when the first cam wheel is in the operational position. The first microswitch is configured to halt operation of a motor upon contact with the first cam.

A second general aspect includes a valve actuator, a valve control shaft extending at least partially through a housing of the valve actuator, where the valve control shaft is configured for controlling a valve position of a diverter valve. The valve actuator also includes and a first cam wheel at least partially surrounding the valve control shaft, where the first cam wheel includes an operational position and an adjustment position, where the first cam wheel is fixed relative to the valve control shaft in the operational position, and where the valve control shaft is rotatable relative to the valve control shaft when the first cam wheel is in the adjustment position.

Implementations may include one or more of the following optional features. The valve actuator may include a first cam extending from an outer perimeter surface of the first cam wheel such that the first cam is moveable relative to the valve control shaft when the first cam wheel is in the adjustment position. The valve actuator may include a first microswitch located in a rotational path of the first cam at least when the first cam wheel is in the operational position. The first cam wheel and the second cam wheel are spaced in a direction parallel to a rotational axis of the valve control shaft. The operational position of the first cam wheel is offset relative to the adjustment position of the first cam wheel in a direction parallel to a rotational axis of the valve control shaft. The o-ring is compressed between the first cam wheel and the valve control shaft when the first cam wheel is in the operational position. The first cam wheel includes at least one o-ring protrusion extending from an inner surface of the first cam wheel for engaging the o-ring when the first cam wheel is in the operational position.

A third general aspect includes a valve actuator, a valve control shaft extending at least partially through a housing of the valve actuator, where the valve control shaft is configured for controlling a valve position of a diverter valve. The valve actuator also includes a first cam wheel extending at least partially around the valve control shaft. The actuator also includes and a first cam fixed to the first cam wheel, where in an operational position, the first cam wheel is fixed relative to the valve control shaft, and where in an adjustment position, the first cam wheel is rotatable relative to the valve control shaft such that the first cam is movable between an infinite number of non-discrete cam positions.

Implementations may include one or more of the following optional features. The valve actuator may include a second cam wheel extending at least partially around the valve control shaft; and a second cam fixed to the second cam wheel, where in an operational position, the second cam wheel is fixed relative to the valve control shaft, and where in an adjustment position, the second cam wheel is rotatable relative to the valve control shaft such that the second cam is movable between an infinite number of non-discrete cam positions.

We claim:

1. A valve actuator, comprising:
   a valve control shaft extending at least partially through a housing of the valve actuator, wherein the valve control shaft is configured for controlling a valve position of a diverter valve;
   a first cam wheel extending at least partially around the valve control shaft; and
   a first cam fixed to the first cam wheel,
   wherein in an operational position, the first cam wheel is fixed relative to the valve control shaft, and
   wherein in an adjustment position, the first cam wheel is retracted from the operational position and is rotatable relative to the valve control shaft such that the first cam is movable between non-discrete cam positions.

2. The valve actuator of claim 1, further comprising a second cam wheel extending at least partially around the valve control shaft; and
   a second cam fixed to the second cam wheel,
   wherein in an operational position, the second cam wheel is fixed relative to the valve control shaft, and
   wherein in an adjustment position, the second cam wheel is retracted from the operational position and is rotatable relative to the valve control shaft such that the second cam wheel is movable between non-discrete cam positions.

3. The valve actuator of claim 2, where—in the operational position—the first cam wheel is spaced apart from the second cam wheel, such that when placed into the adjustment position, the first cam wheel and the second cam wheel each are adjustable independent of one another.

* * * * *